United States Patent
Pineda Amo (10) Patent No.: US 9,624,906 B2
(45) Date of Patent: Apr. 18, 2017

(54) WIND TURBINE STABILIZATION

(71) Applicant: ALSTOM RENOVABLES ESPAÑA, S.L., Barcelona (ES)

(72) Inventor: Isaac Pineda Amo, Sant Cugat del Vallès (ES)

(73) Assignee: Alstom Renovables Espana, S.L., Barcelona (ES)

( * ) Notice: Subject to any disclaimer, the term of this patent is extended or adjusted under 35 U.S.C. 154(b) by 935 days.

(21) Appl. No.: 13/938,095

(22) Filed: Jul. 9, 2013

(65) Prior Publication Data

US 2014/0017083 A1    Jan. 16, 2014

Related U.S. Application Data

(60) Provisional application No. 61/699,113, filed on Sep. 10, 2012.

(30) Foreign Application Priority Data

Jul. 10, 2012 (EP) ..................... 12382274

(51) Int. Cl.
  *F03D 13/20* (2016.01)
  *F03D 7/06* (2006.01)
  (Continued)

(52) U.S. Cl.
  CPC ............. *F03D 7/06* (2013.01); *B63B 21/502* (2013.01); *F03D 7/0296* (2013.01); *F03D 9/12* (2016.05);
  (Continued)

(58) Field of Classification Search
  CPC .......... F03D 13/20; F03D 13/22; F03D 17/00; F03D 80/00; F03D 80/88
  (Continued)

(56) References Cited

U.S. PATENT DOCUMENTS

| 769,493 A | * | 9/1904 | Schlick | .................. B63B 39/04 |
| | | | | 114/122 |
| 1,071,735 A | * | 9/1913 | Haagenson | ............. B63B 39/04 |
| | | | | 114/122 |

(Continued)

FOREIGN PATENT DOCUMENTS

| FR | 2 931 211 | 11/2009 |
| JP | 2012-201219 | 10/2012 |

(Continued)

OTHER PUBLICATIONS

Extended European Search Report for Appl. No. 12382274.4, mailed Dec. 14, 2012, 8 pgs.

*Primary Examiner* — Sean J Younger
(74) *Attorney, Agent, or Firm* — Dority & Manning, P.A.

(57) ABSTRACT

System for stabilizing an offshore horizontal axis wind turbine having a tower, the system comprising sensors for generating signals representing detected movements of the tower, and gyroscopes. Each gyroscope has a spinning axis, an input axis and an output axis, and a flywheel rotatable about the spinning axis. The system further comprises an actuator for each gyroscope, said actuator being arranged with its related gyroscope in such a way that this actuator can apply a torque about the input axis of the gyroscope. The system also comprises a control unit for receiving the signals representing detected movements of the tower, and for providing the actuator with suitable control signals for said actuator to apply a torque about the related gyroscope input axis, said torque about the input axis producing a torque about the output axis of the same gyroscope that at least partly dampens the detected movements of the tower.

16 Claims, 4 Drawing Sheets

(51) Int. Cl.
  *G01C 19/02* (2006.01)
  *F03D 7/02* (2006.01)
  *B63B 21/50* (2006.01)
  *F03D 80/80* (2016.01)
  *F03D 9/12* (2016.01)
  *F03D 13/25* (2016.01)
  *B63B 39/04* (2006.01)
  *B63B 35/44* (2006.01)

(52) U.S. Cl.
  CPC ............ *F03D 13/22* (2016.05); *F03D 13/25* (2016.05); *F03D 80/88* (2016.05); *G01C 19/02* (2013.01); *B63B 39/04* (2013.01); *B63B 2021/505* (2013.01); *B63B 2035/446* (2013.01); *F05B 2240/93* (2013.01); *F05B 2240/95* (2013.01); *F05B 2260/964* (2013.01); *F05B 2270/334* (2013.01); *Y02E 10/723* (2013.01); *Y02E 10/727* (2013.01); *Y02E 60/16* (2013.01); *Y10T 74/1229* (2015.01)

(58) Field of Classification Search
  USPC ...................................... 415/118; 290/44, 55
  See application file for complete search history.

(56) References Cited

U.S. PATENT DOCUMENTS

| | | | | |
|---|---|---|---|---|
| 3,576,134 A | * | 4/1971 | Fersht | B63B 39/04 74/5.22 |
| 4,025,230 A | * | 5/1977 | Kastan | G05D 1/0858 244/17.13 |
| 4,582,013 A | * | 4/1986 | Holland, Jr. | B63H 9/02 114/39.3 |
| 4,822,247 A | * | 4/1989 | Heinz | F03D 1/0608 416/132 B |
| 4,936,750 A | * | 6/1990 | Heinz | F03D 1/0608 416/132 B |
| 6,973,847 B2 | * | 12/2005 | Adams | B63B 39/04 114/121 |
| 7,240,630 B2 | * | 7/2007 | Akers | B63B 39/04 114/122 |
| 2004/0244513 A1 | | 12/2004 | Adams et al. | |
| 2007/0243063 A1 | * | 10/2007 | Schellstede | E02D 27/42 416/10 |
| 2008/0302194 A1 | * | 12/2008 | Elms | B62D 37/06 74/5.34 |
| 2009/0202346 A1 | * | 8/2009 | Baron | F03D 3/068 416/9 |

FOREIGN PATENT DOCUMENTS

| | | | | |
|---|---|---|---|---|
| WO | WO 2009049371 A1 | * | 4/2009 | ............ B63B 39/04 |
| WO | WO 2010/120182 | | 10/2010 | |
| WO | WO 2011/100796 | | 8/2011 | |
| WO | WO 2012060108 A1 | * | 5/2012 | ............ F03B 17/06 |

* cited by examiner

WIND TURBINE STABILIZATION

This application claims the benefit of European Patent Application EP 12382274.4 filed 10 Jul. 2012 and U.S. Provisional Patent Application Ser. No. 61/699,113 filed 10 Sep. 2012, the disclosures of which are hereby incorporated by reference in their entirety for all purposes.

The present invention relates to a system for stabilizing an offshore horizontal axis wind turbine having a tower, and to a method suitable to be performed by such a stabilizing system.

BACKGROUND ART

Offshore wind turbines are being developed that instead of resting on fixed-bottom support structures have a floating support structure.

Several configurations have been proposed for the floating or buoyancy structures: many of these employ floater elements in the form of hollow floater tanks that in use are arranged substantially below the mean sea level and provide a buoyancy force to support the wind turbine. Ballasts in the floater and/or mooring lines anchored to the seabed are provided for achieving stability.

In some of these floating wind turbines, the buoyancy structure is designed to provide an excess buoyancy force and is maintained floating under the mean sea level by taut mooring lines tensioned by the excess buoyancy force.

For example, concepts have been developed such as the "Taught Leg Buoy" (TLB) floating wind turbine, with a slender cylindrical buoy and two sets of tensioned mooring lines, inclined relative to the seabed and connected to gravity anchors and to the buoy; or such as the "Tension Leg Platform" (TLP) floating wind turbine, in which the tensioned mooring lines are substantially vertical and are connected between gravity anchors on the seabed and arms or braces extending radially outwards with respect to the vertical axis of the wind turbine. The TLP arms may be part of the buoyancy structure, for example in the form of hollow spokes that extend radially outward from a hollow central hub, or may be arranged above the sea level, in which case the buoy may be a slender cylindrical tank like in the TLB concept.

The buoyancy structures of floating wind turbines are subject to several loads, such as for example the weight of the wind turbine itself, impacts, forces exerted by waves, currents and tides, and also aerodynamic forces associated to the wind, rotor rotation, etc. These loads, if not sufficiently counteracted, can cause destabilization of the wind turbine and can consequently negatively affect to its operation.

In general, the previously commented structures for offshore wind turbines seem to achieve a certain stabilization of the wind turbine. However, said stabilization may not be ensured enough in some particular situations. For example, wave loading and related low frequency effects may not be significantly counteracted according to the principles attributed to these buoyancy structures. Moreover, dampening of undesired rotations of the wind turbine, especially about a longitudinal axis of the tower (which can be called yawing movements), is not particularly considered by the prior art systems. These yawing movements may penalize the performance of the wind turbine and cause fatigue loads that can finally damage some components of the wind turbine.

Furthermore, any wind turbine normally comprises a pitch system for suitably pitching the blades. It is known that pitch systems can be used to reduce nacelle fore-aft oscillations induced by aerodynamic loads at the first tower mode by adding a collective pitch demand to the general collective pitch demand for rotor/generator speed control. This demand may be typically in phase with the tower fore-aft movement at this first oscillation mode. This way, the thrust force exerted on the nacelle by the wind is changed in such a way that the oscillation is damped. This can be done since the actuation for tower damping and speed control are pretty independent because they act in different frequencies ranges (typically 0-0.1 Hz for speed control and 0.3-0.4 Hz for tower damping).

SUMMARY OF THE INVENTION

There still exists a need for new systems and methods for stabilizing an offshore horizontal axis wind turbine that resolve at least some of the above mentioned problems. It is an object of the present invention to fulfil such a need.

In a first aspect, the present invention provides a system for stabilizing an offshore horizontal axis wind turbine having a tower. This system comprises at least one sensor for generating sensor signals representing detected movements of the tower, and one or more gyroscopes. Each gyroscope has three mutually perpendicular axes: a spinning axis, an input axis and an output axis, and a flywheel rotatable about the spinning axis. The system further comprises a first gyroscope actuator for each gyroscope, said first gyroscope actuator being arranged with its related gyroscope in such a way that this first gyroscope actuator can apply a torque about the input axis of the gyroscope. The system also comprises a control unit for receiving the sensor signals representing detected movements of the tower, and for providing at least one of the first gyroscope actuators with suitable control signals for said first gyroscope actuator to apply a torque about the related gyroscope input axis, said torque about the input axis producing a torque about the output axis of the same gyroscope that at least partly dampens the detected movements of the tower.

One of the key points of this system is the use of gyroscopes for dampening undesired movements of an offshore wind turbine. Gyroscopes are very suitable for that goal as they can be attached to any floating rigid body (i.e. an offshore wind turbine) in such a way that the whole structure of said body can jointly move with the whole structure of the gyroscope. Thus, according to the principles of gyroscopic operation, the application of controlled torques about an axis of the gyroscope may produce reaction torques about another axis of the gyroscope, such that the gyroscope can force the body to move conveniently. These controlled torques may be such that these forced movements may at least partly oppose or counteract the undesired movements of the wind turbine.

Particularly, the stabilizing system of the invention may permit dampening undesired movements in offshore horizontal axis wind turbines by sensing/detecting movements of the tower, and producing suitable control signals depending on the detected movements. These control signals can be sent to the corresponding one or more actuators for them to properly act on the one or more gyroscopes to produce one or more reaction torques (at least partly) dampening the detected movements. This active control of the one or more gyroscopes permits reacting to destabilizing movements in a substantially short time and/or with a more appropriated torque(s) in comparison with e.g. a gyroscope under "free" operation. Further, the proposed stabilizing system may permit a good dampening of yawing movements of the wind turbine by arranging one of the gyroscopes such that suitable reaction torques can be produced about a longitudinal axis of the tower.

In some embodiments, the system may comprise, for at least one of the gyroscopes, a second gyroscope actuator arranged with said gyroscope in such a way that this second gyroscope actuator can apply a torque about the output axis of the gyroscope. Moreover, the control unit may be adapted to provide the second gyroscope actuator with suitable control signals for said second gyroscope actuator to apply a torque about its related output axis, said torque about the output axis causing a torque about the input axis of the same gyroscope that at least partly dampens the detected movements of the tower. Besides, the control unit may be adapted to alternatively provide the suitable control signals to the first gyroscope actuator or to the second gyroscope actuator related to the same gyroscope, depending on the detected movements of the tower. In these embodiments, the control unit may act on the gyroscope in such a way that alternate reaction torques about the output axis and about the input axis may be produced. Therefore, these embodiments have the advantage of that a single gyroscope may permit dampening two different types of destabilizing movements: rolling and pitching, or rolling and yawing, or pitching and yawing.

In another aspect, an offshore horizontal axis wind turbine having a tower may comprise a stabilizing system as described hereinbefore. In some of said embodiments, at least one of the gyroscopes of the stabilizing system may be arranged in such a way that one of its three mutually perpendicular axes is substantially parallel to a longitudinal axis of the tower. Preferably, at least one of the gyroscope axes that are substantially parallel to the longitudinal axis of the tower is an input or an output axis. If the control unit acts on the gyroscope in such a way that proper reaction torques about this input/output axis are produced, rotational movements about the longitudinal axis of the tower (yawing movements) may be suitably dampened.

In some embodiments, the offshore horizontal axis wind turbine comprising the stabilizing system may further comprise a plurality of blades with adjustable pitch, pitch actuators for adjusting the pitch angle of each blade, and sensors for generating sensor signals representing environmental conditions. Moreover, the control unit of the stabilizing system may be adapted to receive sensor signals representing environmental conditions and also sensor signals representative of wind turbine operation and tower movement. The control unit may be also adapted to decompose, depending on the received sensor signals, the detected movements into components dampable through pitch actuation and components dampable through gyroscope actuation. This decomposition may be based, for instance, on the frequency analysis of received sensor signals. The control unit may be further adapted to provide the pitch actuators with suitable control signals for each pitch actuator to adjust the pitch angle of its blade for at least partly dampening the components dampable through pitch actuation. Besides, the control unit may be adapted to perform the provision of suitable control signals to (first and/or second) gyroscope actuators only for at least partly dampening the components dampable through gyroscope actuation.

Using inadequate means for counteracting destabilizing movements may be completely useless and, in some situations, may even worsen the destabilizing movements and their consequences (causing e.g. high fatigue, low performance, etc.). An aspect of the offshore horizontal axis wind turbines of the previous paragraph is that they are able to dampen destabilizing movements by using in each case the most suitable means. For example, if the sensors for detecting environmental conditions detect a situation of movements considered dampable through pitch actuation but not through gyroscope actuation, the control unit may generate suitable control signals to exclusively pitching the blades for dampening said movements. In this case, thus, the control unit would properly influence the pitch actuators and not the gyroscope actuators.

In a second aspect of the invention, a method is provided for stabilizing the offshore horizontal axis wind turbine of the type described hereinbefore. This method comprises the control unit receiving sensor signals representing detected movements of the tower. The method further comprises the control unit providing at least one of the first gyroscope actuators with suitable control signals for said first gyroscope actuator to apply a torque about the related gyroscope input axis, said torque about the input axis producing a torque about the output axis of the same gyroscope that at least partly dampens the detected movements of the tower.

According to embodiments of the method, the offshore horizontal axis wind turbine to be stabilized may comprise a plurality of blades with adjustable pitch, pitch actuators for adjusting the pitch angle of each blade, and sensors for generating sensor signals representing environmental conditions (e.g. wind conditions, wave conditions, etc.). In this case, the method may comprise the control unit receiving the sensor signals representing environmental conditions as well as sensor signals indicative of the detected movements of the tower, and decomposing, depending on the received sensor signals, the detected movements into components dampable through pitch actuation and components dampable through gyroscope actuation. The method may further comprise the control unit providing the pitch actuators with suitable control signals for each pitch actuator to adjust the pitch angle of its blade for at least partly dampening the components dampable through pitch actuation. Besides, the control unit may perform the provision of suitable control signals to (first and/or second) gyroscope actuators only for at least partly dampening the components dampable through gyroscope actuation.

The method of this second aspect of the invention is suitable to be performed by the stabilizing system of the previously commented first aspect of the invention. Thus, the principles and advantages commented with respect to said system may also be of application to this method.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

In the following description, numerous specific details are set forth in order to provide a thorough understanding of the present invention. It will be understood by one skilled in the art however, that the present invention may be practiced without some or all of these specific details. In other instances, well known elements have not been described in detail in order not to unnecessarily obscure the description of the present invention.

Figure 1A:
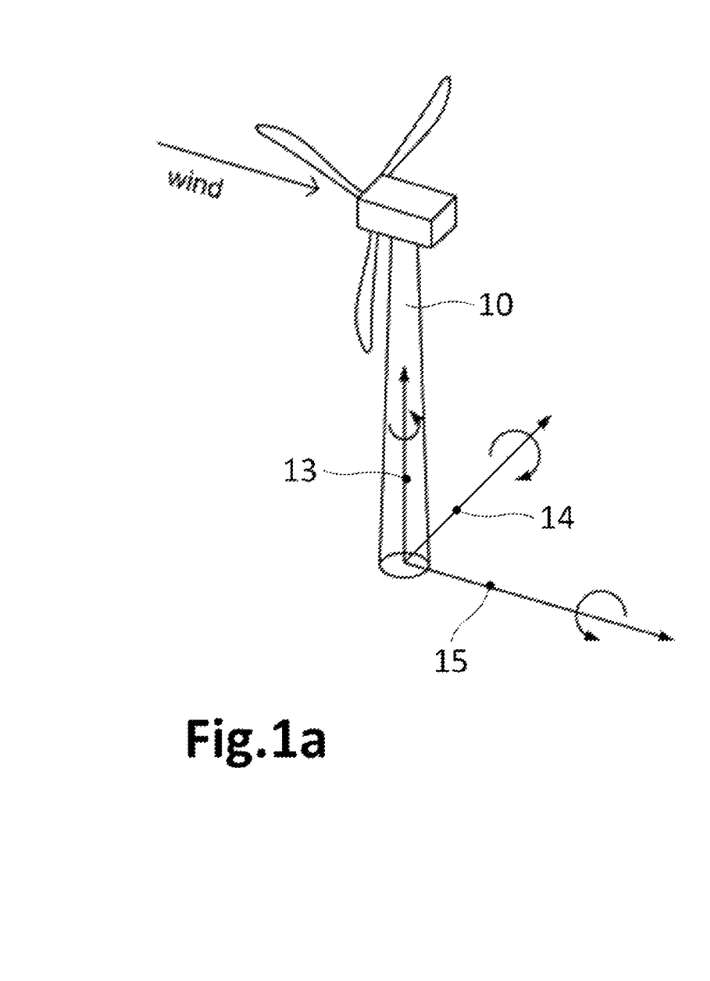
FIG. 1a is a schematic representation of an offshore wind turbine and the main reference axes on a reference frame placed at tower bottom.

FIG. 1a is a schematic representation of an offshore horizontal axis wind turbine having a tower 10 and a floating platform (not shown) supporting the tower 10. This figure also shows the main reference axes 13, 14, 15 on a reference frame placed at a bottom region of the tower 10 of the wind turbine. A first of said axes is commonly called yaw axis 13 which substantially coincides with a longitudinal axis of the tower 10. A second of said axes is the pitch axis 14, and a third axis is the roll axis 15 which is aligned with the wind direction. Rotation about the roll axis 15 corresponds to the side to side rotation of the tower 10, and rotation about the pitch axis 14 corresponds to the tower fore-aft rotation. Loads suffered by the wind turbine exhibit different directions (e.g. although related, wave and wind are not necessarily perfectly aligned), so that overall movement of the tower is not restricted to a pure rotation about either the yaw 13, pitch 14 or roll 15 axis. In any case, any movement of the tower may be decomposed into three components corresponding to a yaw 13, a pitch 14 and a roll 15 rotation respectively. These axes 13, 14, 15 will be used to describe embodiments of the invention hereinafter.

Figure 1B:
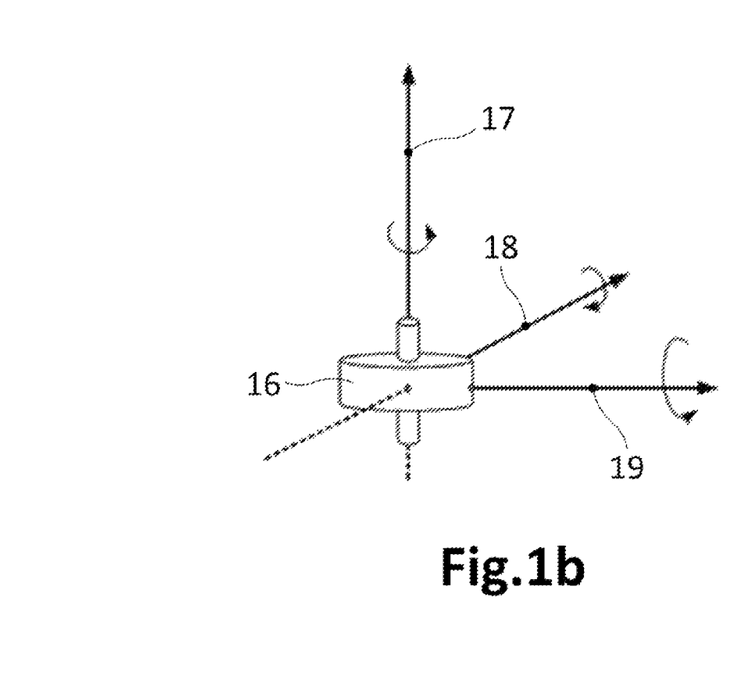
FIG. 1b is a schematic representation of a gyroscope and its main axes.

FIG. 1b is a schematic representation of a gyroscope and its main axes. A gyroscope is a device for measuring or maintaining orientation, based on the principles of conservation of angular momentum. In essence, a mechanical gyroscope is a flywheel 16 spinning around a rotation axis (spinning axis) 17 with an input axis 18 and an output axis 19. The flywheel 16 may be e.g. free to move around the output axis 19 but not around the input axis 18. With this exemplary configuration, an external torque in the input axis 18 will generate movement on the output axis 19 so that the gyroscope generates a torque opposing the input torque. In some cases, the gyroscope may be configured in such a way that also external torques in the output axis 19 can generate movement on the input axis 18 so that the gyroscope generates a torque opposing the output torque. In any case, these gyroscope axes 17, 18, 19 will be used to describe embodiments of the invention hereinafter.

Figure 2:
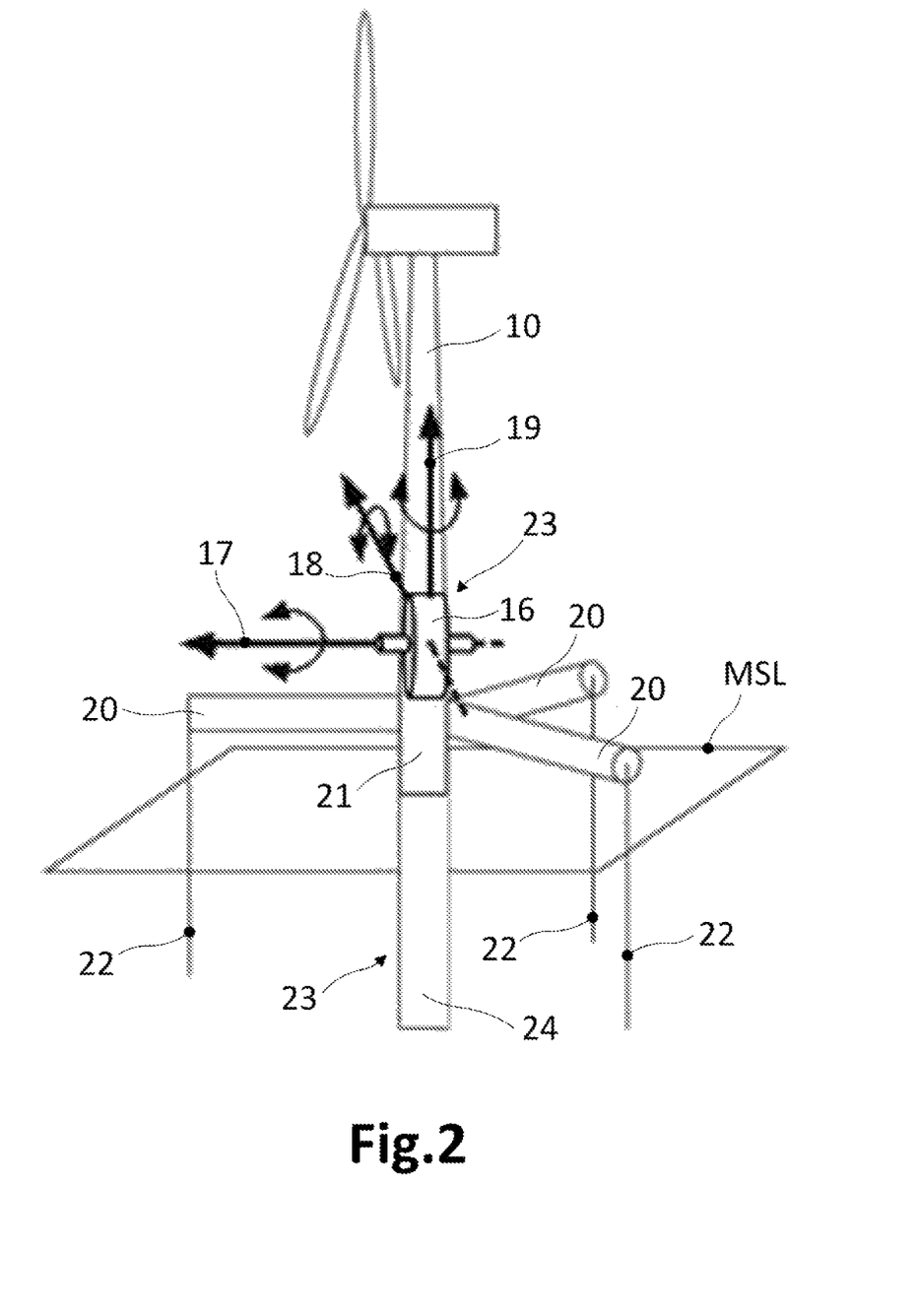
FIG. 2 is a schematic representation of a TLP wind turbine having a stabilizing system according to an embodiment of the invention.

FIG. 2 shows an offshore wind turbine, and more particularly a floating wind turbine of the TLP (Tension Leg Platform) type. This wind turbine may comprise a buoyancy structure 23, with e.g. at least one floater tank 24. The buoyancy structure 23 may be designed such as to remain submerged in a position above the seabed and below the mean sea level MSL, to provide an upward thrust for supporting the weight of the wind turbine and other loads.

This wind turbine is provided with three braces 20, extending radially outward from a wind turbine supporting structure 21, at a height above the mean sea level MSL; a mooring line 22 may be attached to each of the braces 20 at one end and to the seabed at the other end. The supporting structure 21 is arranged between the buoyancy structure 23 and the tower of the wind turbine 10; in some configurations, such a supporting structure 21 is known as "transition piece".

The wind turbine of FIG. 2 also comprises a gyroscope 23 whose output axis 19 is substantially parallel with the yaw axis (or longitudinal axis of the tower 10) of the wind turbine. The gyroscope may e.g. be arranged on one of the three braces 20. Alternatively, the output axis 19 may be substantially coincident with a longitudinal axis of the tower 10, in which case a particular configuration of the tower 10 will be necessary. The spinning axis 17 can be substantially in line with the roll axis of the wind turbine and the input axis 18 may be substantially aligned with the pitch axis of the wind turbine. This configuration may permit dampening undesired yawing rotation movements of the wind turbine (i.e. rotation about a longitudinal axis of the tower), since reaction torques about the output axis 19 opposing the undesired yawing rotation may be generated in a controlled way, as it will be explained later on. Said undesired yawing movements may be caused by external forces from e.g. waves, the wind, etc.

As the pitch and roll axes depend on the wind direction, the wind turbine could comprise an "orientation" system dedicated to put in line the spinning axis 17 and the input axis 18 with the roll axis and the pitch axis respectively, depending on the wind direction. Nevertheless, if the objective is just to damp yawing movements, the spinning axis 17 does not necessarily have to be in line with the roll axis and the input axis 18 does not necessarily have to be in line with the pitch axis. So, in this case, such an orientation system would not be necessary.

FIG. 2 shows the gyroscope 23 attached to a bottom region of the tower, but the gyroscope 23 could be attached to the tower at any height, since the nature of the movements to be dampened (yawing movements) are equally dampable with the gyroscope 23 at any height. In an example, the gyroscope 23 may be attached to the tower in such a way that the output axis is substantially parallel to a longitudinal axis of the tower. Particularly, the gyroscope 23 may be attached to the tower in such a way that the output axis substantially coincides with or is as close as possible to the longitudinal axis of the tower.

The wind turbine shown in FIG. 2 may also comprise suitable sensors (not shown) arranged in such a way that they can generate signals representing yawing movements of the tower 10. Suitable sensors may be, in this case, any kind of sensors aimed at detecting rotatory movements, such as for example accelerometers, rotatory encoders, etc.

This wind turbine may further comprise an actuator (not shown) arranged with the gyroscope 23 in such a way that this actuator can apply a controlled torque about the input axis 18 of the gyroscope 23. This actuator may be of any known type able to generate a rotatory movement and, thus, a torque about the input axis 18 of the gyroscope 23, in a controlled way. The actuator(s) can be pneumatic, hydraulic or electric with the necessary technical properties to generate the required regulated torques about the input axis 18.

Still in reference to FIG. 2, the wind turbine may also comprise a control unit (not shown) adapted to receive signals representing detected yawing movements from the abovementioned sensors. The control unit may also be adapted to take into account the received sensor signals for calculating suitable control signals to be provided to the actuator. These control signals may cause the actuator to apply a proper torque about the input axis 18 generating a reaction torque about the output axis 19 at least partly dampening the detected yawing movements.

Movements of the sea (tides, waves, etc.) may mostly cause low frequency movements. In floating wind turbines in particular, dampening of yawing movements will normally require dampening motions at the yaw natural frequency (~0.1 Hz for a TLP wind turbine, as the one shown in FIG. 2). This rotational mode becomes very important, in general, for the design of mooring lines 22 and, in particular for TLP configurations, for the design and lengthening of the braces 20.

Figure 3:
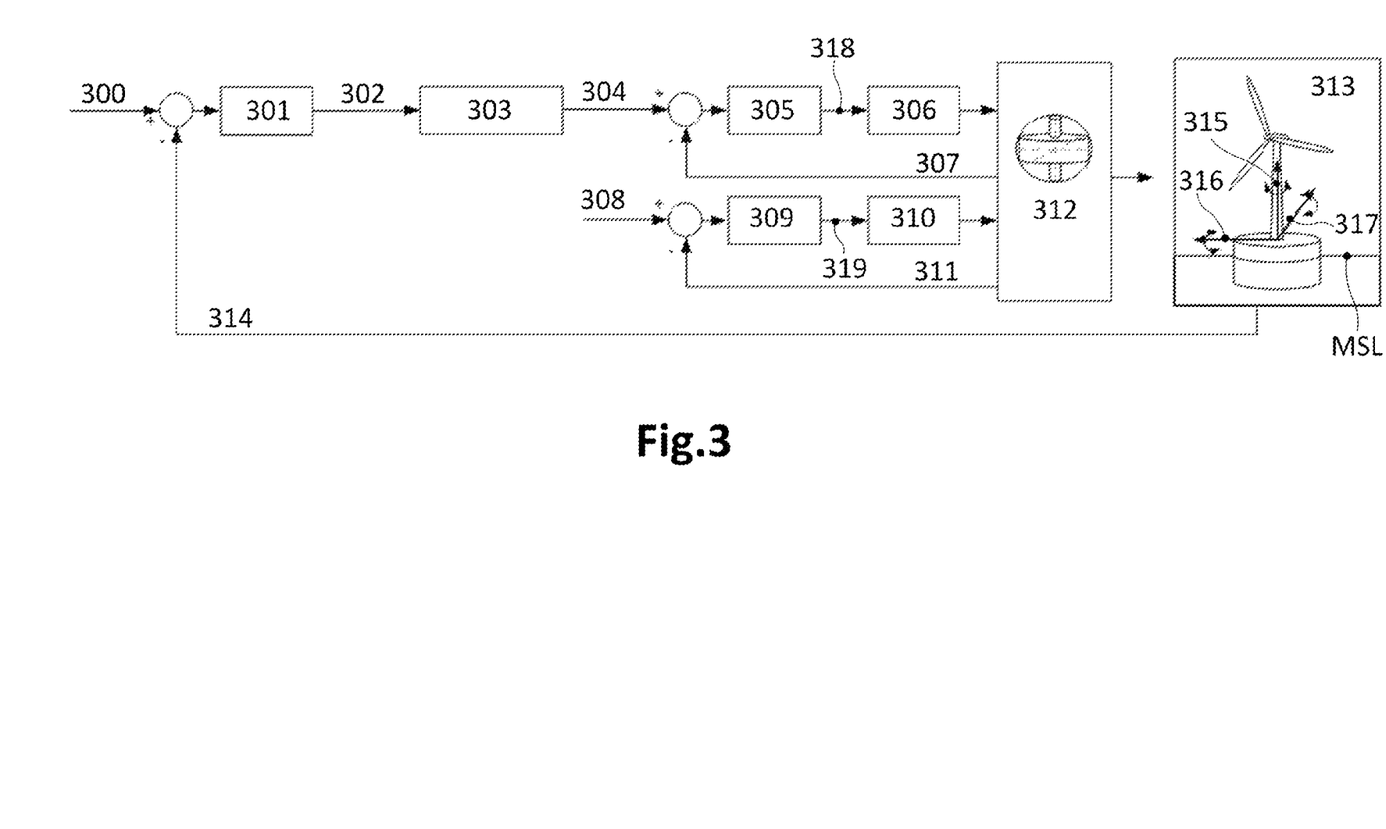
FIG. 3 illustrates a method for stabilizing an offshore wind turbine according to embodiments of the invention.

FIG. 3 shows a schematic representation of a method suitable to be performed in the wind turbine of FIG. 2 or similar, particularly by the control unit of this wind turbine. This method may comprise a sub-method 301 which can be called e.g. "Yaw mode Damping Control" and can operate according to the following control law:

$$T_{dem} = K_d * \omega_f \quad (1)$$

wherein $T_{dem}$ is the torque demand, $K_d$ is a constant representing the control gain (e.g. the gain of a controller implementing the Yaw mode Damping Control 301), and $\omega_f$ is a filtered rotational (or angular) speed of the tower 10 about the yaw axis 13. This filtering of the angular speed is made in order to avoid gyroscopic actuation on other frequencies which do not correspond with the yaw natural frequency (other wind turbine structural modes, other mode, wind/wave excitations, etc.).

The Yaw mode Damping Control 301 applies the equation (1) to produce, from a filtered angular speed $\omega_f$, an output 302 representing the torque demand $T_{dem}$. This filtered angular speed $\omega_f$ may be calculated by subtracting a predefined angular speed of reference 300 minus the measured angular speed 314 about the yaw axis 13. This measured angular speed 314 about the yaw axis 13 may be obtained from the signals received from the corresponding sensors (e.g. accelerometers and/or rotatory encoders, etc.) arranged to that end. In summary, the measured angular speed 314 of undesired yawing movements (optionally filtered according to a predefined angular speed of reference 300) is applied to the equation (1) to calculate the necessary reaction torque 302 about the yaw axis of the wind turbine (i.e. about the output axis of the gyroscope) for dampening said undesired yawing movements.

In some embodiments, the actuator may not be able to work with signals or commands representing torques, $T_{dem}$ 302 may be converted into a rotation or angular speed of the spinning wheel about the input axis 18 (i.e. precession), so that the resulting torque produced about the output axis 19 will be as close as possible to $T_{dem}$ 302. In FIG. 3, this rotation of the spinning wheel about the input axis 18 is indicated by 304 and is obtained by a sub-method 303 applying the following equation:

$$\omega = T/L \quad (3)$$

wherein T refers to the output 302 of the Yaw mode Damping Control 301, L refers to the angular momentum of the wheel 16 spinning around the spinning axis 17 at a constant speed, and ω refers to the angular speed 304 necessary to obtain the reaction torque 302.

The angular momentum L may be calculated by applying the following equation:

$$L = J * \omega_{spin} \quad (4)$$

wherein J is the moment of inertia of the wheel 16, and $\omega_{spin}$ is the constant speed at which the wheel 16 is spinning around the spinning axis 17.

Still in reference to FIG. 3, the method may further comprise another sub-method 305, which may be called "Input Axis Rotation Control". This Input Axis Rotation Control 305 may receive as input the result of subtracting the angular speed 304 (necessary to obtain the reaction torque 302) minus the measured angular speed 307 of the wheel about the input axis 18. The measured angular speed 307 may be obtained from the signals generated by the corresponding sensors arranged to that end. The Input Axis Rotation Control 305 may generate, from the result of subtracting the required angular speed 304 minus the measured angular speed 307, proper control signals 318. These control signals 318 may cause the actuator 306 (based e.g. on hydraulic pistons) to act about the input axis 18 of the gyroscope for producing the required torque about the output axis 19 (i.e. about the yaw axis) as close as possible to $T_{dem}$ 302. In summary, the required angular speed 304 about the input axis is corrected taking into account the measured angular speed 307 about the input axis, and this corrected angular speed is added, through the corresponding control signals, to the current (measured) angular speed about the input axis to finally cause the required torque 302 about the output axis.

In order to guarantee that the wheel is spinning about the spinning axis at the necessary constant speed (and also to properly start up and stop it) the method may comprise a sub-method 309 implementing such functionalities. This sub-method 309 (which may be called "Spin Rotation Control") may produce proper control signals 319 and send them to a spin actuator 310 in such a way that the constant spinning speed is ensured at operation. The Spin Rotation Control 309 may generate these control signals 319 from the result of subtracting a predefined spinning speed demand 308 minus the measured spinning speed 311. The measured spinning speed 311 may be received from the corresponding sensors arranged to that end.

The main idea of the embodiment illustrated by FIG. 3 is that the magnitude of the necessary torque about the output axis is controlled by the magnitude of the precession (rotation of the wheel about the input axis) rate. And this torque about the output axis is used to damp wind turbine yaw oscillations. For the configuration referred to by FIGS. 2 and 3, the nacelle rotation does not affect the configuration of the gyroscope as it acts upon the same rotational axis.

Figure 4:
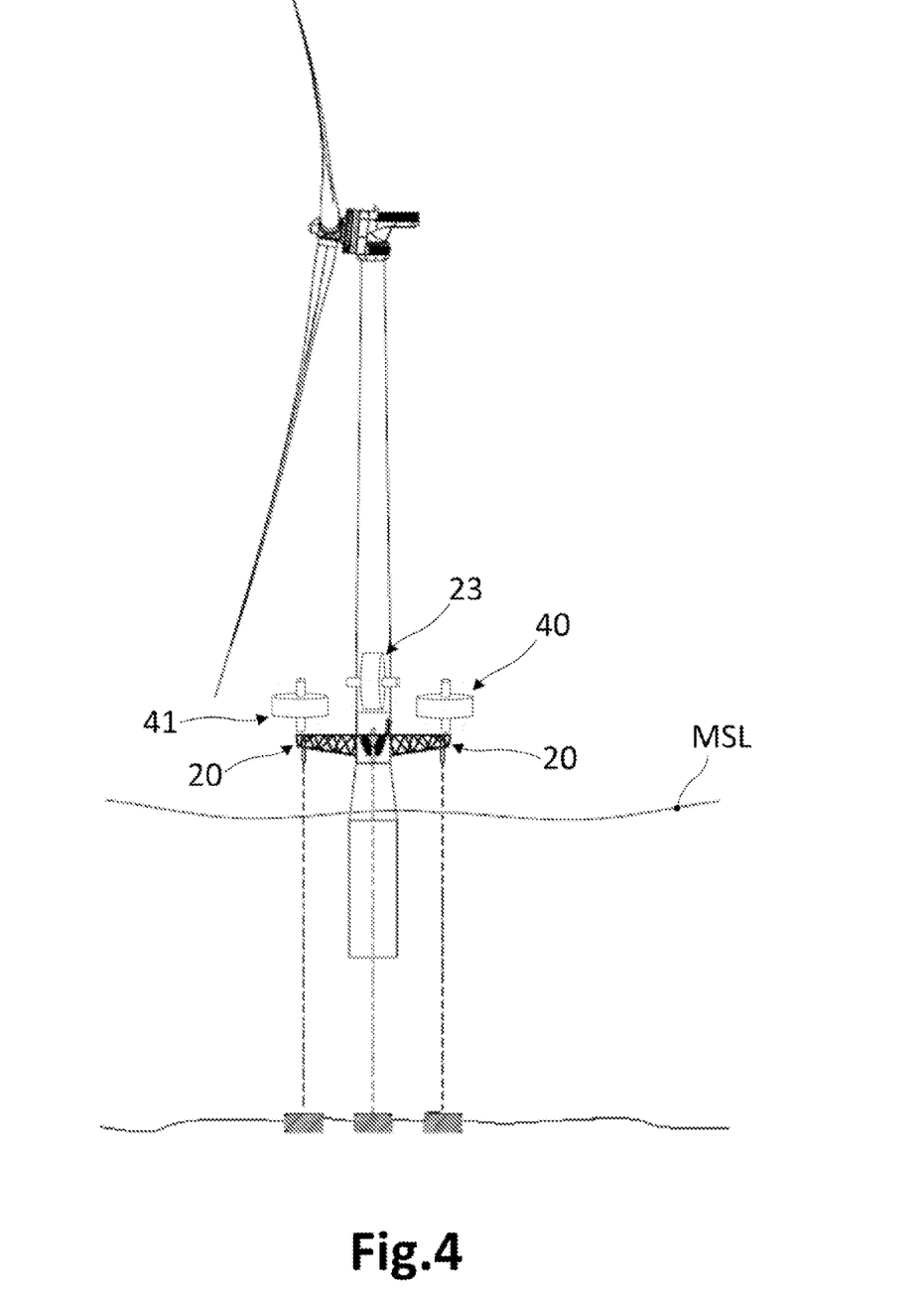
FIG. 4 is a schematic representation of a wind turbine similar to the wind turbine of FIG. 2, but having a stabilizing system according to another embodiment of the invention.

FIG. 4 illustrates schematically a wind turbine similar to the one shown in FIG. 2. The only difference is that this other wind turbine comprises two further gyroscopes 40, 41 arranged on different braces 20 respectively. A first of these two other gyroscopes (e.g. 40) may be arranged with its spinning axis parallel to the longitudinal axis of the tower (or yaw axis of the wind turbine) and its output axis parallel to the pitch axis of the wind turbine. A first orientation system (not shown) may be dedicated to orientate this gyroscope 40 such that, depending on the wind direction, its output axis is moved to be substantially parallel to the pitch axis of the wind turbine. A second of the two other gyroscopes (e.g. 41) may be arranged with its spinning axis parallel to the longitudinal axis of the tower (or yaw axis of the wind turbine) and its output axis parallel to the roll axis of the wind turbine. A second orientation system (not shown) may be dedicated to orientate this gyroscope 41 such that, depending on the wind direction, its output axis is moved to be substantially parallel to the roll axis of the wind turbine. Therefore, the gyroscope 23, as explained with respect to FIG. 3, may be in charge of dampening undesired yawing movements, the gyroscope 40 may dampen fore-aft movements, and the gyroscope 41 may dampen side to side movements. As a matter of fact, movement of the tower is not restricted to a pure rotation about only one of the yaw 13, roll 14 or pitch 15 axes. As a result, decomposition of the sensed movement into its fundamental components is required, so that each gyroscope can be effectively operated to damp its associated rotation.

In general, each of the braces or some of them may have a related gyroscope arranged on it, each one of the gyroscopes having common and/or different roles. For example, a wind turbine may have four braces and each brace may have a gyroscope arranged on it, two of these gyroscopes dedicated to damp roll movements and two of these gyroscopes dedicated to damp pitch movements.

Each of the gyroscopes 40 and 41 may have the corresponding sensors and actuators in accordance with their respective roles, in a more or less equivalent way as explained for the gyroscope 23 of FIG. 3. For example, the gyroscope 40 may have associated proper sensors suitably arranged for detecting rotations about the pitch axis of the wind turbine (fore-aft movements), and the corresponding actuator(s) to act about its input axis accordingly. Similar methods to the one described for FIG. 3 may be applied by the control unit to generate the necessary control signals for the gyroscopes 40 and 41 in accordance with their respective roles.

Alternatively to having the two gyroscopes 40 and 41 arranged in such a way that the axes of the gyroscopes 40, 41 may be moved to be parallel to their related axes of the wind turbine (e.g. in the way explained three paragraphs before), some of the gyroscope axes may not be moved to be substantially parallel to the corresponding wind turbine axes. In this case, the wind turbine may not comprise any orientation system for the gyroscopes, but it may be necessary to take into account, in each or most of the situations, the relative deviation(s) between gyroscope axes and wind turbine axes for calculating the torques to be applied to the corresponding input axes. The deviations and their consequences may be added e.g. to the method of control as explained with reference to FIG. 3.

Alternatively to having the two gyroscopes 40, 41 or the three gyroscopes 40, 41, 23, the wind turbine may comprise only one of them (e.g. 40). In this case, however, the wind turbine may comprise a first actuator for acting on its input axis and a second actuator for acting on its output axis. Furthermore, the control unit may be adapted to alternatively provide, depending on the detected movements of the tower, suitable control signals to the first actuator or to the second actuator, such that this single gyroscope 40 may suffice to dampen both side to side and fore-aft movements. In these embodiments, the wind turbine may further comprise an orientation system to move this single gyroscope 40 in accordance with each movement (pitch, roll or movement about any intermediate axis) to be dampened; i.e. to rotate the gyroscope 40 about its spinning axis 17 in such a way that its input or output axis is forced to be parallel with respect to the corresponding pitch, roll or intermediate axis of the wind turbine.

In yet another alternative example, the wind turbine may comprise a single gyroscope (e.g. 40) with a related single orientation system and single actuator. In this alternative configuration, the single actuator may be configured to act only on the input axis and the single orientation system may be configured to rotate the gyroscope 40 around its spinning axis 17, so that its output axis lies parallel with the pitch, the roll or any required intermediate axis depending on the movement of the wind turbine to be dampened. Of course, the control unit may be adapted to send the corresponding control signals to the single actuator and single orientation system accordingly.

Alternatively to having the gyroscopes 40 and 41 arranged on respective braces 20, the gyroscopes 40 and 41 can be attached to the base of the union between the tower and the floating structure. As the gyroscopes 40 and 41 are in charge of dampening pitch/roll movements, the optimal position for the gyroscopes 40 and 41 may be at the bottom of the tower. Theoretically, the wind turbine regions where there is a greater relative displacement (i.e. regions of maximum angular speeds for a particular mode) are those regions in which the same force or torque has a greater effect on the whole structure. In the case of pitch/roll movements, said regions of maximum angular speeds and where a same torque has a greater effect on the structure are located at the bottom of the tower. If the overall structure tower-braces-floater is rigid enough, the arrangement of the gyroscopes 40 and 41 on the respective braces 20 may be suitable to obtain the desired dampening effects.

In any of the embodiments, a gyroscope used to dampen a specific type of movement components (e.g. yawing or pitching or rolling components) may be substituted by a combination of several gyroscopes suitable to achieve identical or similar effects. For instance, the single gyroscope 23 of FIGS. 3 and 4 could be substituted by two or more different gyroscopes whose sum of individual moments of inertia is identical or similar to the moment of inertia of the single gyroscope 23. These two or more different gyroscopes should be properly mutually arranged (e.g. aligned along or parallel to the yaw axis) and suitably coordinated to achieve the same or similar effects to those generated by the single gyroscope 23.

According to the equation (4), variation of the speed $\omega_{spin}$ at which the wheel is spinning about the spinning axis causes the angular momentum L to vary proportionally to said variation of the speed $\omega_{spin}$. According to the equation (3), the resulting torque T about the output axis is proportional to the angular speed w about the input axis and to the angular momentum L. Therefore, a first option to regulate the resulting torque T about the output axis may be properly varying the angular speed w about the input axis while maintaining a constant speed $\omega_{spin}$ at which the wheel is spinning about the spinning axis. A second possibility to regulate the resulting torque T about the output axis may be properly varying the speed $\omega_{spin}$ at which the wheel is spinning about the spinning axis while avoiding rotation of the wheel about the input axis. And a third option could be a combination of said first and second options. Thus, in different embodiments, the control unit may be adapted to control the resulting torque T about the output axis by applying said first option and/or said second option and/or said third option.

As commented in the background art section, any wind turbine normally comprises a pitch system for suitably pitching the blades, said pitching of the blades being normally used to reduce nacelle fore-aft oscillations at the first tower mode. Nevertheless, in floating wind turbines, there are some particular problems with that. For example, the natural frequencies of the wind turbine are lower than in onshore applications and they can fall within the control speed frequency range. This means that the interaction between a tower damping and a speed control loop is significant and this makes it difficult to use both simultaneously because the speed control and damping control are linked and improving one may deteriorate the other, and conversely. Another problem may be that a tower damping loop using pitch only acts in the wind direction, whereas in a floating wind turbine, the wind may not be the predominant movement factor, instead the waves.

A third problem may be that the speed control using collective pitch may introduce negative damping in the system. This is because any movement of the nacelle (at low frequencies) may be assumed by the speed control as a change in wind speed and its actuation upon the pitch system may worsen the original tower movement. For example, if the wind turbine rolls forward at low frequency, the nacelle relative wind speed may increase which, in turn, may cause the speed of the rotor to increase. In this situation, the speed control may increase the pitch angle which, in turn, may cause a decrease of the thrust force on the rotor which, in turn, may cause the wind turbine to roll forward even more. In conclusion, the action of the speed control has produced a negative damping.

Hence, in some embodiments, the offshore wind turbine may combine a damping system based on gyroscopes (identical or similar to those previously described) and another damping system based on pitching the blades. In this case, some sensors may be dedicated to detect environmental conditions, such as e.g. wind direction and/or intensity, wave direction and/or intensity, etc. Furthermore, the control unit may be adapted to receive signals from the sensors in charge of sensing undesired movements of the wind turbine and/or from sensors dedicated to sense environmental conditions, and to interpret them such that movements of different nature can be detected. In particular, this interpretation of the sensor signals may comprise decomposing the detected movements into components dampable through pitch actuation and components dampable through gyroscope actuation. Besides, the control unit may produce suitable control signals and send them to the pitching dampening system and/or to the gyroscopic dampening system, depending in each case on the movement component(s) to be counteracted.

For example, the control unit may be able to detect, from the received sensor signals, very low frequency movement components (i.e. with a frequency below a predefined frequency threshold), in which case they may be dampened by gyroscopic action. And/or the control unit may be adapted to detect, from the received sensor signals, nacelle fore-aft oscillations at the first tower mode, in which case they may be dampened by properly pitching the blades. And/or the control unit may detect, from the received sensor signals, situations of low wind intensity and high waves intensity, in which case the detected destabilizing movements of the wind turbine may be mainly dampened by gyroscopic action. And/or the control unit may detect, from the received sensor signals, situations of high wind intensity and low waves intensity, in which case the detected destabilizing movements of the wind turbine may be mainly dampened by pitching the blades. And/or the control unit may be adapted to detect, from the received sensor signals, negative dampening caused by the system itself, in which case the damping based on pitching action may be reduced and the damping based on gyroscopic action may be increased. Etc.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A system for stabilizing an offshore horizontal axis wind turbine having a tower, the system comprising:
   at least one sensor for generating sensor signals representing detected movements of the tower;
   one or more gyroscopes, each gyroscope having three mutually perpendicular axes; a spinning axis, an input axis and an output axis, and a flywheel rotatable about the spinning axis, wherein the one or more gyroscopes comprises a first gyroscope;
   one or more gyroscope actuators for each of the one or more gyroscopes, wherein the one or more gyroscope actuators comprises a first gyroscope actuator for the first gyroscope, the first gyroscope actuator being arranged with the first gyroscope in such a way that this first gyroscope actuator can apply a torque about the input axis of the first gyroscope;
   wherein the one or more gyroscope actuators comprises a second gyroscope actuator arranged with the first gyroscope in such a way that this second gyroscope actuator can apply a torque about the output axis of the first gyroscope; and
   a control unit for receiving the sensor signals representing detected movements of the tower, and for providing the first gyroscope actuator with suitable control signals for the first gyroscope actuator to apply a torque about the related first gyroscope input axis, the torque about the input axis producing a torque about the output axis of the first gyroscope that at least partly dampens the detected movements of the tower and
   providing the second gyroscope actuator with suitable control signals for the second gyroscope actuator to apply a torque about the output axis of the first gyroscope, the torque about the output axis of the first gyroscope causing a torque about the input axis of the first gyroscope that at least partly dampens the detected movements of the tower;
   wherein the control unit is adapted to alternatively provide, depending on the detected movements of the tower, the suitable control signals to the first gyroscope actuator or to the second gyroscope actuator of the first gyroscope.

2. The system according to claim 1, wherein the control unit is adapted to identify, from the sensor signals representing detected movements of the tower, low frequency movements, which are movements with a frequency below a predefined frequency threshold; and wherein the control unit is adapted to provide the suitable control signals to gyroscope actuators only for the low frequency movements.

3. An offshore horizontal axis wind turbine comprising a tower and a stabilizing system according to claim 2.

4. An offshore horizontal axis wind turbine comprising a tower and a stabilizing system according to claim 1.

5. The offshore horizontal axis wind turbine according to claim 4, wherein at least one of the gyroscopes of the stabilizing system is arranged in a bottom region of the tower.

6. The offshore horizontal axis wind turbine according to claim 4, wherein at least one of the gyroscopes of the stabilizing system is arranged in such a way that one of its three mutually perpendicular axes is substantially parallel to a longitudinal axis of the tower.

7. The offshore horizontal axis wind turbine according to claim 6, wherein at least one of the gyroscope axes that are substantially parallel to the longitudinal axis of the tower is substantially coincident with the longitudinal axis of the tower.

8. The offshore horizontal axis wind turbine according to claim 6, wherein at least one of the gyroscope axes that are substantially parallel to the longitudinal axis of the tower is a spinning axis.

9. The offshore horizontal axis wind turbine according to claim 6, wherein at least one of the gyroscope axes that are substantially parallel to the longitudinal axis of the tower is an input or an output axis.

10. The offshore horizontal axis wind turbine according to claim 4, wherein one of the gyroscopes is arranged on a front side of the tower and another gyroscope is arranged on a rear side of the tower.

11. The offshore horizontal axis wind turbine according to claim 4, wherein the wind turbine is a "Tension Leg Platform." (TLP) type.

12. The offshore horizontal axis wind turbine according to claim 11, further comprising a plurality of braces extending radially outwards with respect to a longitudinal axis of the tower, the braces configured for being arranged above sea level;
  wherein for one or more of the plurality of braces one of the gyroscopes is arranged on the brace.

13. The offshore horizontal axis wind turbine according to claim 12, further comprising a plurality of blades with adjustable pitch, pitch actuators for adjusting the pitch angle of each blade, and sensors for generating sensor signals representing environmental conditions;
  wherein the control unit is adapted to receive the sensor signals representing environmental conditions;
  wherein the control unit is adapted to decompose, depending on the received sensor signals representing environmental conditions or the received sensor signals representing detected movements of the tower, detected movements into components dampable through pitch actuation and a components dampable through gyroscope actuation;
  wherein the control unit is adapted to provide the pitch actuators with suitable control signals for each pitch actuator to adjust the pitch angle of its blade for at least partly dampening the components damnable through pitch actuation; and
  wherein the control unit is adapted to provide suitable control signals to gyroscope actuators only for at least partly dampening the components dampable through gyroscope actuation.

14. The offshore horizontal axis wind turbine according to claim 4, further comprising a plurality of blades with adjustable pitch, pitch actuators for adjusting the pitch angle of each blade, and sensors for generating sensor signals representing environmental conditions;
  wherein the control unit is adapted to receive the sensor signals representing environmental conditions;
  wherein the control unit is adapted to decompose, depending on the received sensor signals representing environmental conditions or the received sensor signals representing detected movements of the tower, detected movements into components dampable through pitch actuation and components dampable through gyroscope actuation;
  wherein the control unit is adapted to provide the pitch actuators with suitable control signals for each pitch actuator to adjust the pitch angle of its blade for at least partly dampening the components dampable through pitch actuation; and
  wherein the control unit is adapted to provide suitable control signals to gyroscope actuators only for at least partly dampening the components dampable through gyroscope actuation.

15. A method for stabilizing an offshore horizontal axis wind turbine according to claim 4, the method comprising:
  the control unit receiving the sensor signals representing detected movements of the tower;
  the control unit providing at least one of the one or more gyroscope actuators with suitable control signals for the one or more gyroscope actuators to apply a torque about the related gyroscope input axis, the torque about the related gyroscope input axis producing a torque about the output axis of the same gyroscope that at least partly dampens the detected movements of the tower.

16. A method according to claim 15, wherein the offshore horizontal axis wind turbine further comprises a plurality of blades with adjustable pitch, pitch actuators for adjusting the pitch angle of each blade, and sensors for generating sensor signals representing environmental conditions;
  wherein the method further comprises:
  the control unit receiving the sensor signals representing environmental conditions;
  the control unit decomposing, depending on the received sensor signals representing environmental conditions or the received sensor signals representing detected movements of the tower, detected movements into components dampable through pitch actuation and a components dampable through gyroscope actuation;
  the control unit providing the pitch actuators with suitable control signals for each pitch actuator to adjust the pitch angle of its blade for at least partly dampening the components dampable through pitch actuation; and
  wherein the control unit provides suitable control signals to gyroscope actuators only for at least partly dampening the components dampable through gyroscope actuation.

* * * * *